US 6,650,388 B2

(12) United States Patent
Ohta et al.

(10) Patent No.: US 6,650,388 B2
(45) Date of Patent: Nov. 18, 2003

(54) LIQUID CRYSTAL DISPLAY DEVICE HAVING PARTICULAR COUNTER ELECTRODES

(75) Inventors: Masuyuki Ohta, Kariya (JP); Junichi Ohwada, Mobara (JP); Nobutake Konishi, Mobara (JP); Masayuki Hikiba, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/760,385

(22) Filed: Jan. 11, 2001

(65) Prior Publication Data

US 2001/0007490 A1 Jul. 12, 2001

(30) Foreign Application Priority Data

Jan. 12, 2000 (JP) .......................................... 2000-003348

(51) Int. Cl.⁷ ............................................. G02F 1/1343
(52) U.S. Cl. ........................ 349/139; 349/141; 349/143
(58) Field of Search ................................. 349/139, 141, 349/146, 142, 143

(56) References Cited

U.S. PATENT DOCUMENTS

| | | | | |
|---|---|---|---|---|
| 5,737,051 A | * | 4/1998 | Konodo et al. | 349/141 |
| 5,949,511 A | * | 9/1999 | Park | 349/42 |
| 5,995,187 A | * | 11/1999 | Wakagi et al. | 349/141 |
| 6,075,582 A | * | 6/2000 | Onnagawa et al. | 349/145 |
| 6,088,078 A | * | 7/2000 | Kim et al. | 349/141 |
| 6,233,034 B1 | * | 5/2001 | Lee et al. | 349/141 |
| 6,327,013 B1 | * | 12/2001 | Tombling et al. | 349/139 |
| 6,356,331 B1 | * | 3/2002 | Ono et al. | 349/141 |

FOREIGN PATENT DOCUMENTS

JP          2001027229          1/2001

OTHER PUBLICATIONS

Lee, S.H., et a., "16.4L: Late–News Paper: A Novel Wide–Viewing–Angle Technology:Ultra–Trans View," *SID 99 Digest* (1999) pp:202–205.

* cited by examiner

Primary Examiner—Robert H. Kim
Assistant Examiner—Mike Qi
(74) Attorney, Agent, or Firm—Townsend and Townsend and Crew LLP

(57) ABSTRACT

A liquid crystal display device includes a first substrate. A second substrate is facing the first substrate. A liquid crystal layer is interposed between the first and second substrates. At least one pixel area is defined by a plurality of gate lines and a plurality of drain lines arranged in a matrix over the first substrate, wherein the plurality of gate lines are extending in a first direction, and the plurality of drain lines are extending in a second direction. A first electrode is assigned to the pixel area, wherein the first electrode is provided over the first substrate. A second electrode is assigned to the pixel area and is facing the first electrode, wherein the second electrode is provided over the first substrate and is transparent. The second electrode has a solid portion and a hollow portion. The hollow portion is superposed to at least a portion of the first electrode. An insulating layer is provided between the first and second electrodes.

24 Claims, 9 Drawing Sheets

LIQUID CRYSTAL DISPLAY DEVICE HAVING PARTICULAR COUNTER ELECTRODES

CROSS-REFERENCES TO RELATED APPLICATIONS

The present application is related to and claims priority from Japanese Patent Application No. 2000-003348, filed Jan. 12, 2000.

BACKGROUND OF THE INVENTION

The present invention relates to a liquid crystal display device and, more particularly, to a liquid crystal display device which is called In-Plane Switching Mode.

Liquid crystal display device which is called In-Plane Switching Mode has a construction in which a pixel electrode and a counter electrode which causes an electric field (an in-plane electric field) having a component parallel to transparent substrates to be generated between the counter electrode and the pixel electrode are formed in each liquid crystal-side pixel area of one of the transparent substrates disposed in opposition to each other with a liquid crystal interposed therebetween.

This type of liquid crystal display device is constructed so that the amount of light to be transmitted through the area between the pixel electrode and the counter electrode is controlled by the driving of the liquid crystal to which the electric field is applied.

Such a liquid crystal display device is known as a type which is superior in so-called viewing angle characteristics and enables a displayed image to be unchanged even when its display surface is observed from an oblique direction.

The pixel electrode and the counter electrode have so far been formed of a metal layer which does not transmit light therethrough.

In recent years, a liquid crystal display device constructed in the following manner has been known: a counter electrode made of a transparent electrode is formed over the entire area of a pixel area except the periphery thereof, and strip-shaped pixel electrodes are formed on the counter electrode with an insulating film interposed therebetween, in such a manner as to be extended in one direction and to be juxtaposed in a direction traverse to the one direction.

The liquid crystal display device having this construction causes an in-plane electric field to be generated between each of the pixel electrodes and the counter electrode, and is still superior in viewing angle characteristics and is greatly improved in aperture ratio.

Incidentally, this art is described, for example, in SID (Society for Information Display) 99 DIGEST: pp. 202–205 and Japanese Patent Laid-Open No. 202356/1999, which is incorporated herein by reference.

However, in the liquid crystal display device having this construction, the occurrence of so-called horizontal smear is visually observed on its display portion, and the occurrence of image retention is also visually observed.

It has been found out that the cause of the occurrence of horizontal smear is that the capacitance between the counter electrode formed over the entire area of the pixel area except the periphery thereof and the plural strip-shaped pixel electrodes formed in juxtaposition on the counter electrode with the insulating film interposed therebetween becomes larger than in previous type and the charge of the pixel electrodes with signal voltages becomes insufficient, and also the voltage of the counter electrode is distorted and the time required for the distorted voltage to be restored to its original state becomes long.

It has also been found out that the cause of the occurrence of image retention is that an electric field other than an electric field which has a component parallel to the substrate between the pixel electrode and the counter electrode and contributes to the control of the optical transmissivity of the liquid crystal, i.e., an electric field having a component perpendicular to the substrate between the counter electrode and the pixel electrode, is excessively strong.

SUMMARY OF THE INVENTION

The present invention has been made on the basis of the above-described situations, and provides a liquid crystal display device which can restrain the occurrence of horizontal smear.

The present invention also provides a liquid crystal display device which can restrain the occurrence of image retention.

A representative aspect of the invention disclosed in the present application will be described below in brief.

In one embodiment, a liquid crystal display device includes a first substrate. A second substrate is facing the first substrate. A liquid crystal layer is interposed between the first and second substrates. At least one pixel area is defined by a plurality of gate lines and a plurality of drain lines arranged in a matrix over the first substrate, wherein the plurality of gate lines are extending in a first direction, and the plurality of drain lines are extending in a second direction. A first electrode is assigned to the pixel area, wherein the first electrode is provided over the first substrate. A second electrode is assigned to the pixel area and is facing the first electrode, wherein the second electrode is provided over the first substrate and is transparent. The second electrode has a solid portion and a hollow portion. The hollow portion is superposed to at least a portion of the first electrode. An insulating layer is provided between the first and second electrodes.

In another embodiment, a liquid crystal display device according to the present invention includes a pair of substrates, a liquid crystal layer interposed between the pair of substrates, a plurality of pixel parts being constructed with a plurality of gate lines and a plurality of drain lines arranged in a matrix on one of the pair of substrates, at least one pair of the first electrodes and the second electrodes provided for each pixel part between one of the pair of substrates and the liquid crystal layer, wherein the first electrode and the second electrode being disposed with an insulating film interposed therebetween, and the second electrode is transparent electrode formed in a rectangular shape and having a slit formed in a portion which is superposed on the first electrodes.

In the liquid crystal display device constructed in this manner, the selected ones of the plural electrodes of the other electrode (for example, pixel electrodes) are formed not to be superposed on the one of the pair of electrodes (for example, a counter electrode).

Accordingly, it is possible to decrease the capacitance occurring between the pixel electrode and the counter electrode, whereby it is possible to restrain the occurrence of horizontal smear.

In addition, it is possible to weaken an electric field other than an electric field which contributes to the control of the optical transmissivity of the liquid crystal, i.e., an electric field having a component perpendicular to the substrate between the counter electrode and the pixel electrode, from among electric fields occurring between the pixel electrode and the counter electrode, whereby it is possible to restrain the occurrence of image retention.

Moreover, since the holes formed in the other-side electrode are disposed with respect to one-side electrodes that are not adjacent to one another, the holes are formed with a comparatively large space, whereby the holes have the advantage of being easily worked.

BRIEF DESCRIPTION OF THE DRAWINGS

The present invention will be more apparent from the following detailed description, when taken in conjunction with the accompanying drawings, in which.

DESCRIPTION OF THE SPECIFIC EMBODIMENTS

Preferred embodiments of the liquid crystal display device according to the present invention will be described below.

[Embodiment 1]

<<Construction of Pixel>>

Figure 1:
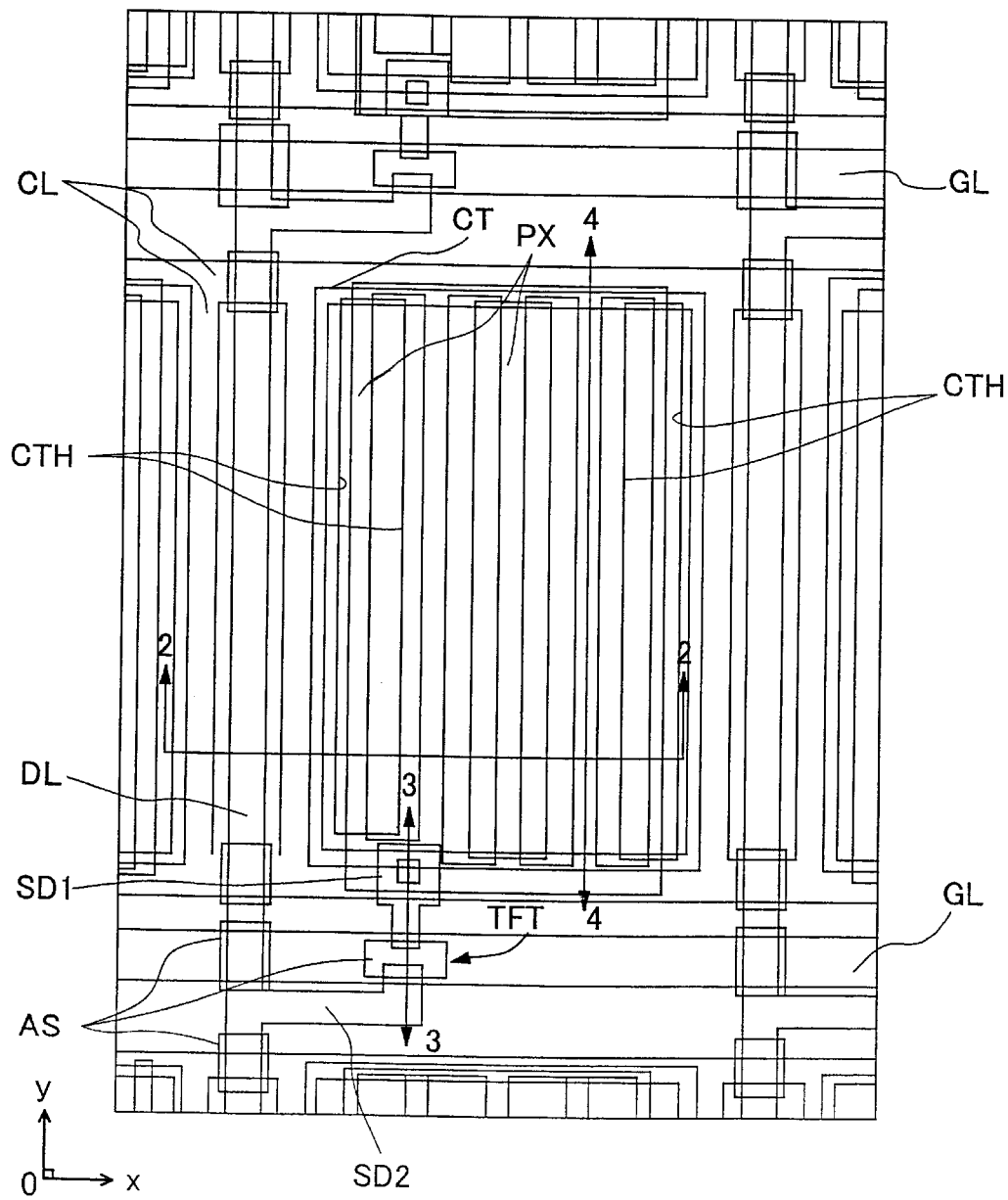
FIG. 1 is a plan view showing one embodiment of a pixel of a liquid crystal display device according to the present invention.

FIG. 1 is a plan view showing the construction of a pixel area of a liquid crystal display device (panel) according to the present invention as viewed from the liquid-crystal side of one of transparent substrates disposed in opposition to each other with a liquid crystal interposed therebetween.

Figure 2:
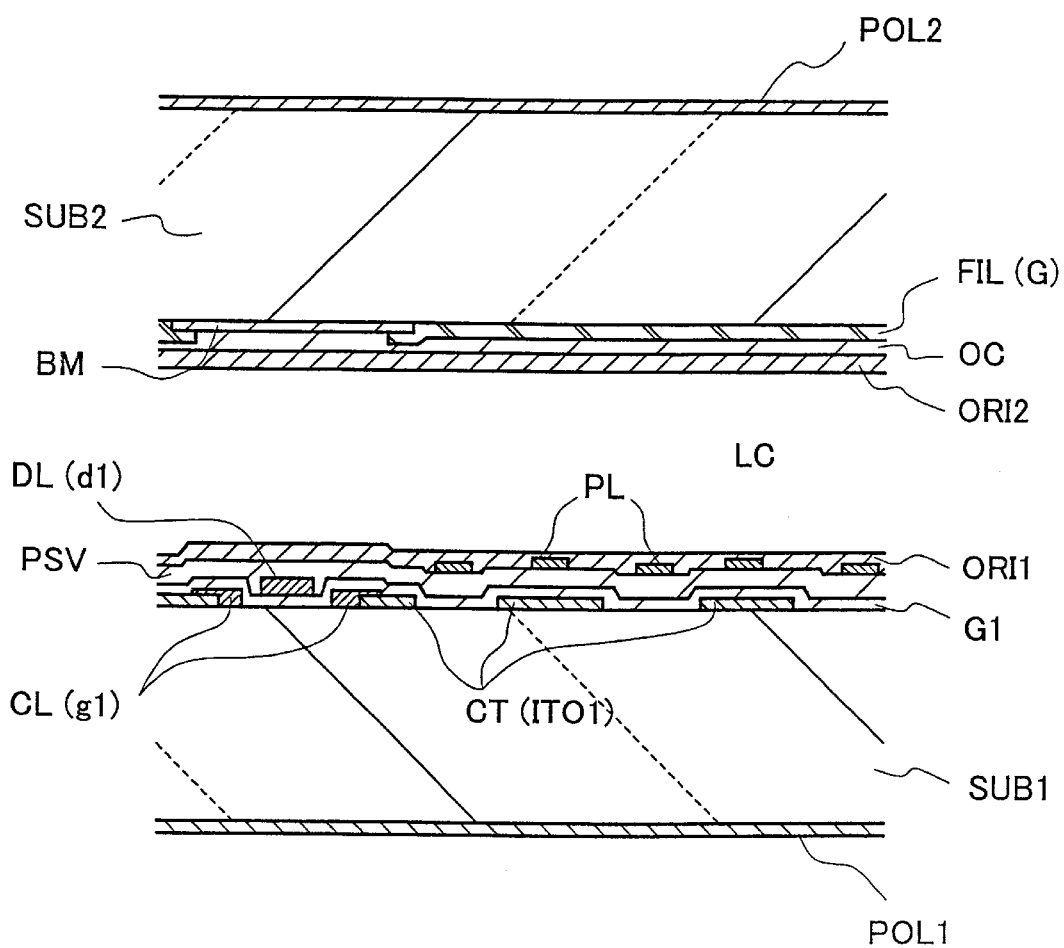
FIG. 2 is a cross-sectional view taken along line 2—2 of FIG. 1.
Figure 3:
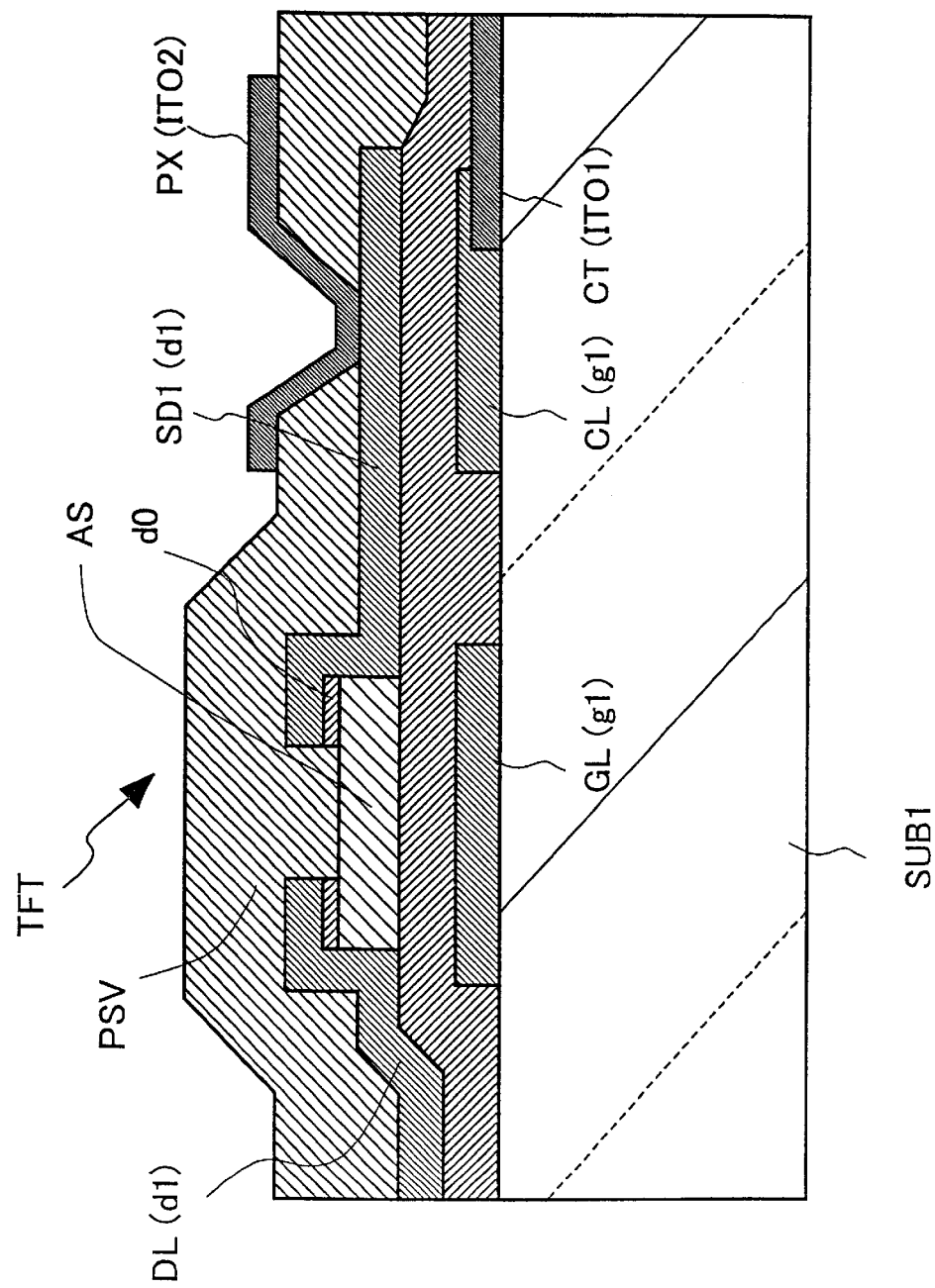
FIG. 3 is a cross-sectional view taken along line 3—3 of FIG. 1.
Figure 4:
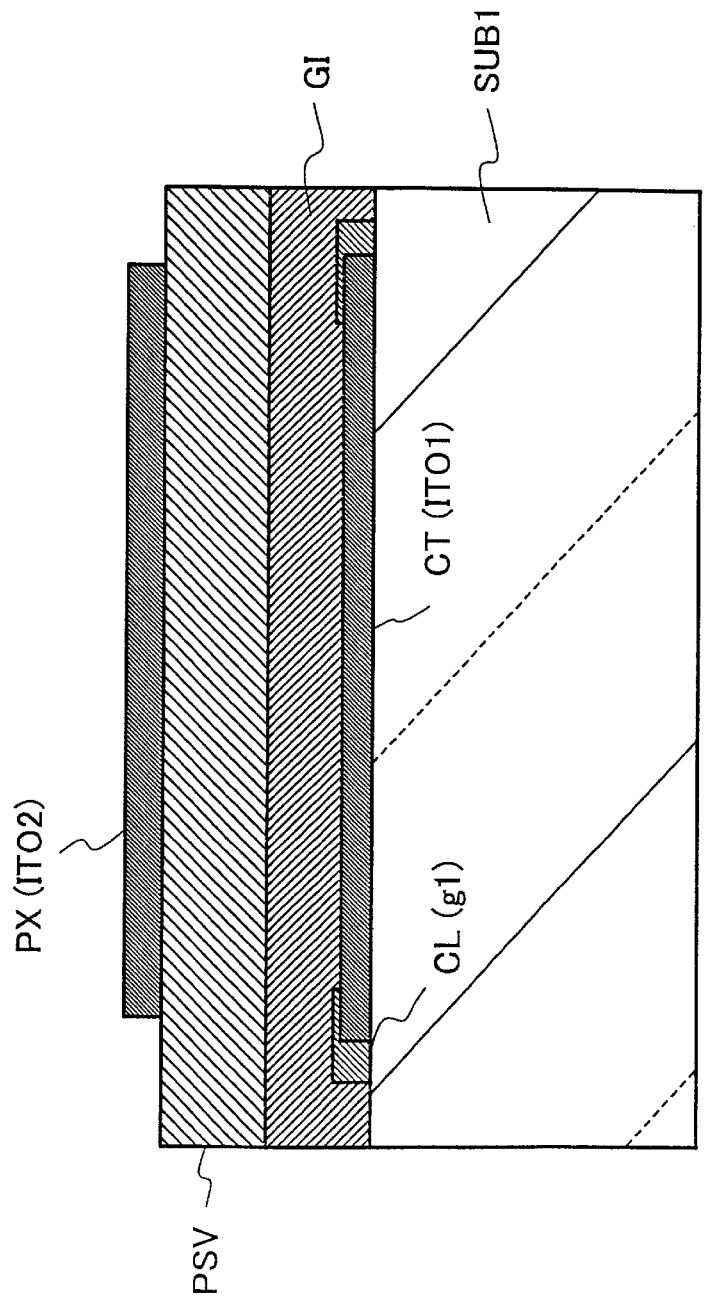
FIG. 4 is a cross-sectional view take along line 4—4 of FIG. 1.

FIG. 2 is a cross-sectional view taken along line 2—2 of FIG. 1, FIG. 3 is a cross-sectional view taken along line 3—3 of FIG. 1, and FIG. 4 is a cross-sectional view take along line 4—4 of FIG. 1.

Referring first to FIG. 1, gate signal lines GL are disposed to be extended in the x-direction of FIG. 1 and to be juxtaposed in the y-direction of FIG. 1, and the gate signal lines GL are formed of, for example, chromium (Cr). These gate signal lines GL form a rectangular area together with drain signal lines DL which will be described below, and the area constitutes a pixel area.

A counter electrode CT which generates an electric field between the counter electrode CT and pixel electrodes PX which will be described below are formed in this pixel area. This counter electrode CT is formed in the central portion of the pixel area except the periphery thereof, and is made of, for example, ITO1 (Indium-Tin-Oxide) which forms a transparent conductive layer.

As will be described later in detail, the plural pixel electrodes PX are formed in juxtaposition, and the counter electrode CT is formed in such a manner as to be superposed on the plural pixel electrodes PX with an insulating film GI interposed therebetween. Holes CTH are respectively formed in the portions of the counter electrode CT that are superposed on every other one of the pixel electrodes PX. As used herein, the term "superpose" refers a structural relationship between two materials, where one material is overlapping or vertically aligned to another material in part or in whole without regards as to which material is provided on top. For example, the counter electrode CT, which has been described above as being "superposed" to the pixel electrodes, may be provided above the pixel electrodes or beneath the pixel electrodes, according to the definition provided herein. Similarly, the term "overlap" merely refers to describe a situation where one material is provided over another material without making any limitation as to which material is provided on top.

A counter voltage signal line CL is formed to be connected to the counter electrode CT in such a manner as to border the entire periphery thereof. This counter voltage signal line CL is formed integrally with counter voltage signal lines CL which are similarly formed at the respective counter electrodes CT in the right and left pixel areas as viewed in FIG. 1 (i.e., the corresponding one of the pixel areas arrayed along the gate signal lines GL).

In this case, the counter voltage signal lines CL are connected to one another at each of locations above and below the pixel areas. This construction is intended to minimize the portion of superposition of each of the counter voltage signal lines CL and the adjacent one of the drain signal lines DL which will be described later, thereby reducing the capacitance generated therebetween.

Each of these counter voltage signal lines CL is formed of an opaque material made of, for example, chromium (Cr). In this case, even if an electric field which acts as noise is generated between any of the drain signal lines DL which will be described later and the periphery of the adjacent one of the counter electrodes CT and the optical transmissivity of the liquid crystal is not obtained as desired, that portion is shielded by the counter voltage signal line CL, whereby it is possible to solve a problem in terms of display quality.

This also means that it is possible to solve a problem due to an electric field (noise) which is generated between any of the gate signal lines GL and the periphery of the adjacent one of the counter electrodes CT.

In addition, as described above, since the material of the counter voltage signal lines CL is identical to that of the gate signal lines GL, the counter voltage signal lines CL and the gate signal lines GL can be formed in the same process, whereby it is possible to avoid an increase in the number of manufacturing steps.

It goes without saying that the material of the counter voltage signal lines CL is not limited to Cr and the counter voltage signal lines CL may be formed of, for example, Al or a material which contains Al.

In this case, it is effective to position the counter voltage signal lines CL as a layer which overlies the counter electrodes CT. This is because Al is easily melted by an etching solution (for example, HBr) for selectively etching an ITO film which constitutes the counter electrodes CT.

Furthermore, it is effective to interpose a high melting point metal such as Ti, Cr, Mo, Ta or W at least the interface between each of the counter voltage signal lines CL and the adjacent one of the counter electrodes CT. This is because ITO which constitutes the counter electrodes CT oxidizes Al of the counter voltage signal lines CL and generates a high-resistance layer.

For this reason, as one example, if the counter voltage signal lines CL made of Al or a material which contains Al are to be formed, it is preferable to form each of the counter voltage signal lines CL as a multilayered structure having a first layer made of the high melting point metal.

In this manner, the counter electrodes CT, the counter voltage signal lines CL and the gate signal lines GL are formed over the transparent substrate, and the insulating film GI made of, for example, SiN is formed over the transparent substrate in such a manner as to cover all of the counter electrodes CT, the counter voltage signal lines CL and the gate signal lines GL.

The insulating film GI has the function of an interlayer insulating film for insulating the drain signal lines DL from the counter voltage signal lines CL and the gate signal lines GL. The insulating film GI also has the function of a gate insulating film in each area in which a thin film transistor TFT which will be described below is formed, as well as the function of a dielectric film in each area in which a capacitance element Cstg which will be described below is formed.

The thin film transistor TFT is formed to be superposed on a portion of the gate signal line GL (the bottom left portion of FIG. 1), and in this portion, a semiconductor layer AS made of, for example, amorphous silicon (a-Si) is formed on the insulating film GI.

A source electrode SD1 and a drain electrode SD2 are formed on the upper surface of the semiconductor layer AS, whereby an inverted staggered structure MIS transistor is formed which uses a portion of the gate signal line GL as its gate electrode. The source electrode SD1 and the drain electrode SD2 are formed at the same time as the drain signal line DL.

Specifically, the drain signal lines DL which are disposed to be extended in the y-direction of FIG. 1 and to be juxtaposed in the x-direction of FIG. 1 are formed, and a portion of an adjacent one of the drain signal lines DL is extended to the surface of the semiconductor layer AS and constitutes the drain electrode SD2 of the thin film transistor TFT.

During the formation of the adjacent drain signal line DL, the source electrode SD1 is formed, and this source electrode SD1 is extended to the inside of the pixel area, thereby integrally forming a contact portion which provides connection between the thin film transistor TFT and the pixel electrode PX which will be described below.

As shown in FIG. 3, a contact layer d0 which is doped with, for example, an n type impurity is formed at the interface between the source electrode SD1 and the drain electrode SD2 of the semiconductor layer AS.

This contact layer d0 is formed by forming an n type impurity-doped layer over the entire surface of the semiconductor layer AS, and, after forming the source electrode SD1 and the drain electrode SD2, etching the n type impurity-doped layer on the portion of the surface of the semiconductor layer AS that is exposed between these electrodes SD1 and SD2, by using each of these electrodes SD1 and SD2 as a mask.

In Embodiment 1, the semiconductor layer AS is formed not only in the area in which the thin film transistor TFT is formed, but also at the intersection of the drain signal line DL and the gate signal line GL and at the intersection of the drain signal line DL and the counter voltage signal line CL. This construction is intended to strengthen the function of the interlayer insulating film.

A protective film PSV covers the thin film transistor TFT formed over the surface of a transparent substrate SUB1 on which the thin film transistor TFT is formed. The protective film is generally made of a dielectric material, for example, SiN. The protect film prevents the thin film transistor TFT from coming into direct contact with the liquid crystal LC.

Furthermore, the pixel electrode PX which is made of a transparent conductive film are formed over the upper surface of the protective film PSV. The pixel electrode PX is generally made of a conductive material, for example, Indium-Tin-Oxide (ITO2).

In Embodiment 1, five pixel electrodes PX are formed to be superposed on an area in which the counter electrode CT is formed, and are also formed to be extended in the y direction of FIG. 1 and to be equidistantly spaced apart from one another. Both ends of each of the five pixel electrodes PX are connected to the respective ends of the adjacent one by layers made of the same material which is formed to be extended in the x direction of FIG. 1.

In this construction, three pixel electrodes PX which are respectively disposed at the first, third and fifth positions as viewed from the left side of FIG. 1 are positioned in the respective holes CTH formed in the counter electrode CT.

Specifically, within a substantial pixel area, i.e., within the aperture of a black matrix, each of the first, third and fifth pixel electrodes PX is formed without being superposed on the counter electrode CT, and the other pixel electrodes PX which are respectively disposed at the second and fourth positions as viewed from the left side of FIG. 1 are formed to be superposed on the counter electrode CT.

In the case where the pixel electrodes PX are formed in this manner, since the area of superposition of the pixel electrodes PX and the counter electrodes CT can be decreased, the capacitance between the pixel electrodes PX and the counter electrodes CT can be decreased, whereby it is possible to decrease the occurrence of so-called horizontal smear.

In this construction, the holes CTH are formed in the counter electrode CT in such a manner as to correspond to every other one of the pixel electrodes PX. This construction is intended to facilitate the working of the holes CTH by increasing the spaces between the adjacent holes CTH.

In Embodiment 1, the number of pixel electrodes PX per pixel area is five, but there actually are cases in which dozens of pixel electrodes are formed per pixel area. In such a case, the holes CTH may be formed at positions which correspond to not only every other one of the pixel electrodes PX but also every third one, every fourth one and so on, whereby it is possible to achieve far easier working of the holes CTH.

Figure 8:
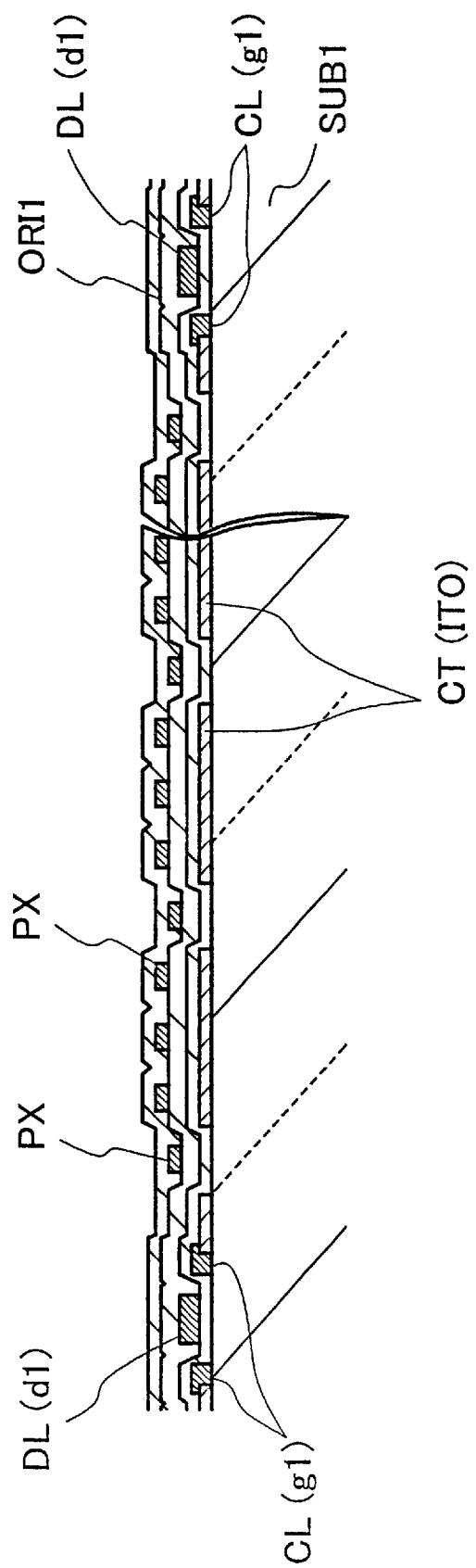
FIG. 8 is a cross-sectional view showing another embodiment of the liquid crystal display device according to the present invention.

FIG. 8 is a view which shows such a construction and corresponds to FIG. 2. In the construction shown in FIG. 8, the holes CTH are formed in the counter electrode CT which underlies the juxtaposed multiple pixel electrodes PX, at positions which correspond to every fourth one of the pixel electrodes PX.

In addition, in this embodiment, the central axis of every fourth one of the pixel electrodes PX agrees with that of the corresponding one of the holes CTH formed in the counter electrode CT, and each of the holes CTH is formed to have a width larger than the corresponding one of the pixel electrodes PX.

Figure 5:
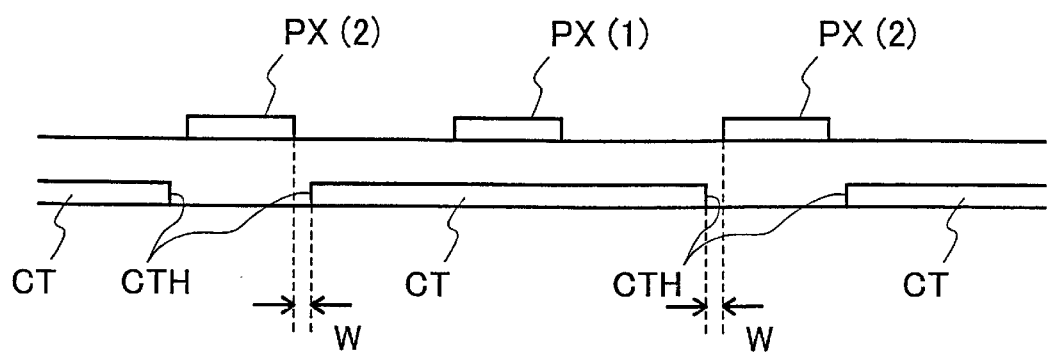
FIG. 5 is an explanatory view showing the positional relationship between pixel electrodes and holes formed in a counter electrode of the liquid crystal display device according to the present invention.

FIG. 5 is a cross-sectional view (which corresponds to the cross-sectional view of FIG. 2) showing the positional relationship between the pixel electrodes PX and the holes CTH formed in the counter electrode CT.

As can be seen from FIG. 5, each of the counter electrodes CT which are separated by the formation of the holes CTH (but are connected for electrical connection at their opposite peripheral ends) is formed to be superposed on pixel electrodes PX(2) adjacent to a pixel electrode PX(1) which is one of the pixel electrodes PX, and to be extended to the area between each of the pixel electrodes PX(2) and the pixel electrode PX(1) as viewed in the direction of juxtaposition of the pixel electrodes PX. Thus, each of the counter electrodes CT is formed to have an area superposed on the pixel electrode PX(1) and widths W.

The widths W are mainly determined from the point of view of decreasing an electric field other than an electric field which contributes to the control of the optical transmissivity of the liquid crystal between the pixel electrode PX and the counter electrode CT, that is to say, an electric field which has a component perpendicular to the substrate between the counter electrode CT and the pixel electrode PX. Accordingly, it is appropriate to make each of the widths W smaller than the separation distance between the pixel electrode PX(1) and each of the pixel electrodes PX(2) adjacent to the pixel electrode PX(1).

The widths W are preferably as wide as possible, but slightly smaller than the respective separation distances.

In other words, the peripheral outline portion of the counter electrode CT has only to lie at the intermediate position between the pixel electrode PX(1) and each of the pixel electrodes PX(2) adjacent to the pixel electrode PX(1), and the counter electrode CT has to be wider than the pixel electrode PX(1), preferably slightly wider.

The reason for this is that the existence of the widths W makes it possible to strengthen an electric field having a component approximately parallel to the transparent substrate in each pixel area and to decrease an electric field which occurs in a direction perpendicular to the substrate and adversely affects the phenomenon of image retention. In addition, as the widths W are made larger, the absorption loss of light due to transparent electrodes becomes smaller and higher optical transmissivity can be obtained.

The bottom-end same-material layer of each of the pixel electrodes PX which are formed in this manner is connected to a contact portion of the source electrode SD1 of the thin film transistor TFT through a contact hole formed in the protective film PSV. The top-end same-material layer is formed to be superposed on the counter voltage signal line CL.

In the case of this construction, a capacitance element Cstg which uses as a dielectric film a stacked film made of the insulating film GI and the protective film PSV is formed in the portion of superposition of the counter electrode CT and each of the pixel electrodes PX.

This capacitance element Cstg is formed for purposes such as storing a video signal in the pixel electrode PX for a comparatively long period even if the thin film transistor TFT is turned off after the video signal from the drain signal line DL is applied to the pixel electrode PX via the thin film transistor TFT.

An alignment film ORI1 which covers the pixel electrodes PX is formed over the surface of the transparent substrate SUB1 over which the pixel electrodes PX are formed in the above-described manner. This alignment film ORI1 is a film which is in direct contact with the liquid crystal LC and determines the initial alignment direction of the liquid crystal LC.

Incidentally, in Embodiment 1, the initial alignment direction is made 75° with respect to the direction of application of an electric field. The initial alignment direction is not limited to 75°, and may be greater than 0° and less than 90°, preferably 10° to 80° so that high-speed responses (drivable at low voltages) can be achieved.

In the above-described embodiment, the gate signal lines GL, the counter voltage signal lines CL and the drain signal lines DL are formed of chromium (Cr). However, it goes without saying that another high melting point metal such as Mo, W, Ti or Ta or an alloy of two or more kinds of such metals or a stacked film made of two or more kinds of such metals may also be used.

Moreover, although in the above description the transparent conductive film is made of ITO, it goes without saying that similar advantages can be obtained even with IZO (Indium-Zinc-Oxide).

The transparent substrate constructed in this manner is called a TFT substrate, and a transparent substrate disposed in opposition to this TFT substrate with the liquid crystal LC interposed therebetween is called a filter substrate.

<<Filter Substrate>>

As shown in FIG. 2, on the liquid crystal-side surface of the filter substrate, a black matrix BM is formed to separate the pixel areas from one another, and a filter FIL is formed to cover each aperture of the black matrix BM that determines a substantial pixel area.

An overcoat layer OC made of, for example, a resin layer is formed to cover the black matrix BM and the filter FIL, and an alignment layer ORI2 is formed on the overcoat layer OC.

The alignment direction of the alignment layer ORI2 is selected to be the same as that of the alignment film ORI1 when the alignment film ORI1 is superposed on the alignment layer ORI1. That is to say, the alignment of the molecules of the liquid crystal LC is made homogeneous.

<<Liquid Crystal Layer>>

In Embodiment 1, a liquid crystal having a dielectric anisotropy $\Delta\epsilon$ of, for example, −5 is used, whereby it is possible to obtain a high optical transmissivity. This is because the directors of the liquid crystal molecules of a liquid crystal of negative $\Delta\epsilon$ do not greatly change due to an electric-field component perpendicular to a substrate surface.

Embodiment 1 uses a liquid crystal of negative $\Delta\epsilon$, but even if a liquid crystal of positive $\Delta\epsilon$ is used, the effects and advantages of the present invention can similarly be obtained.

Since the liquid crystal of positive $\Delta\epsilon$ is large in $\Delta\epsilon$ and low in viscosity compared to the liquid crystal of negative $\Delta\epsilon$, the liquid crystal of positive $\Delta\epsilon$ has the advantage of being drivable at lower voltages and at higher response speeds.

<<Entire Construction of Liquid Crystal Display Panel>>

Figure 6:
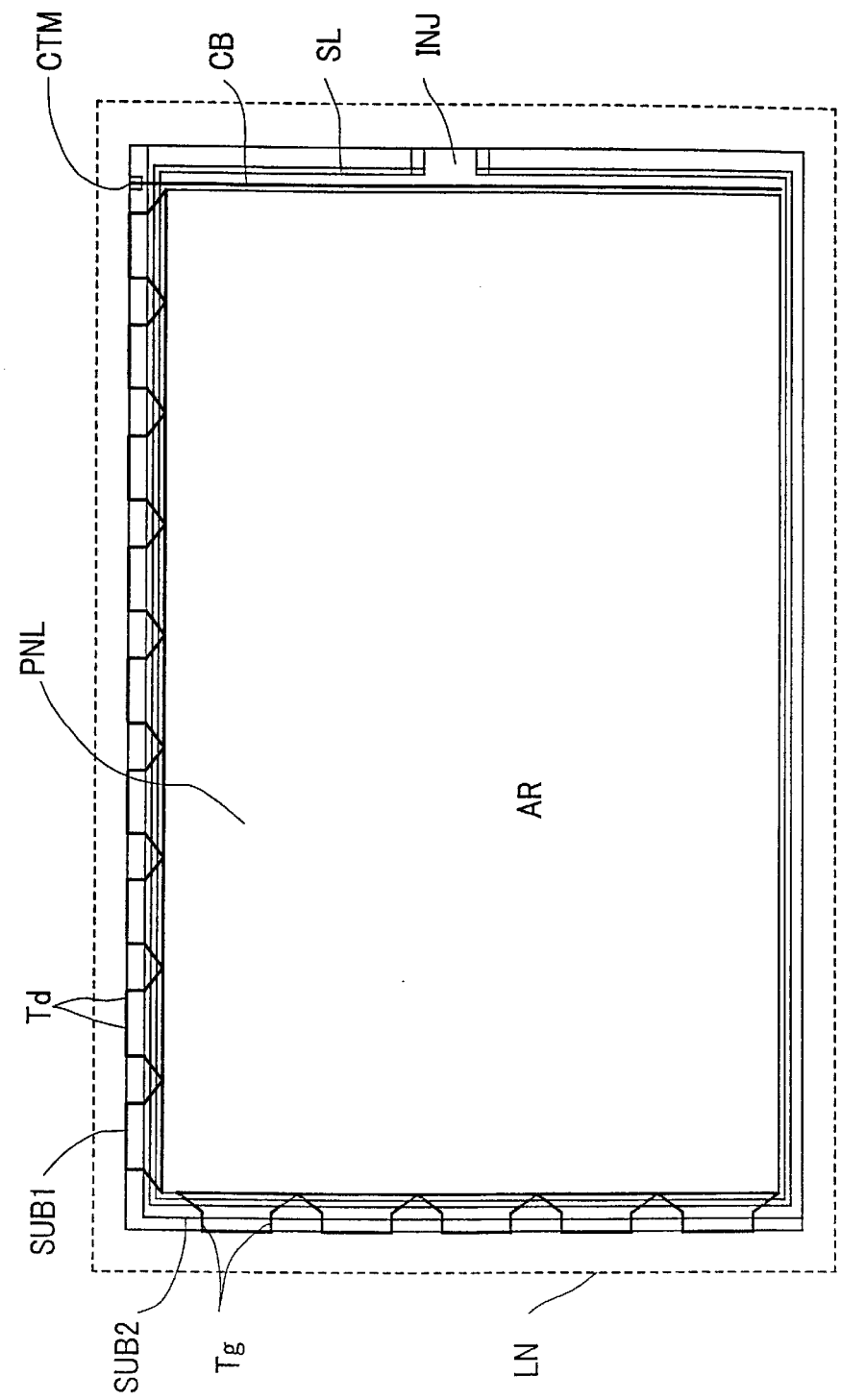
FIG. 6 is a plan view showing one embodiment of the whole of the liquid crystal display panel of the liquid crystal display device according to the present invention.

FIG. 6 is a view of the entire construction of the liquid crystal display panel, showing a display area AR constructed of an assembly of pixel areas arranged in matrix form.

A transparent substrate SUB2 is formed to be slightly smaller than the transparent substrate SUB1, and the right and bottom sides (as viewed in FIG. 6) of the transparent substrate SUB2 are disposed to be approximately in flush with the corresponding sides of the transparent substrate SUB1.

Accordingly, areas which are not covered with the transparent substrate SUB2 are respectively formed along the left and top sides (as viewed in FIG. 5) of the transparent substrate SUB1, and gate signal terminals Tg and drain signal terminals Td are formed in the respect areas. The gate signal terminals Tg are formed for supplying scanning signals to the respective gate signal lines GL, while the drain signal terminals Td are formed for supplying video signals to the respective drain signal lines DL.

The transparent substrate SUB2 is secured to the transparent substrate SUB1 by a sealing material SL formed along the periphery of the transparent substrate SUB2, and this sealing material SL also has the function of a sealing material for sealing the liquid crystal LC between the transparent substrates SUB1 and SUB2.

A liquid crystal filling port INJ is disposed in a portion of the sealing material SL, and after the gap between the transparent substrates SUB1 and SUB2 has been filled with the liquid crystal LC through the liquid crystal filling port INJ, the liquid crystal filling port INJ is sealed by a liquid crystal sealing material (not shown).

Polarizers are respectively stuck to the outside surfaces of the transparent substrates SUB1 and SUB2 in such a manner that the transparent substrates SUB1 and SUB2 are interposed between the polarizers.

<<Equivalent Circuit>>

Figure 7:
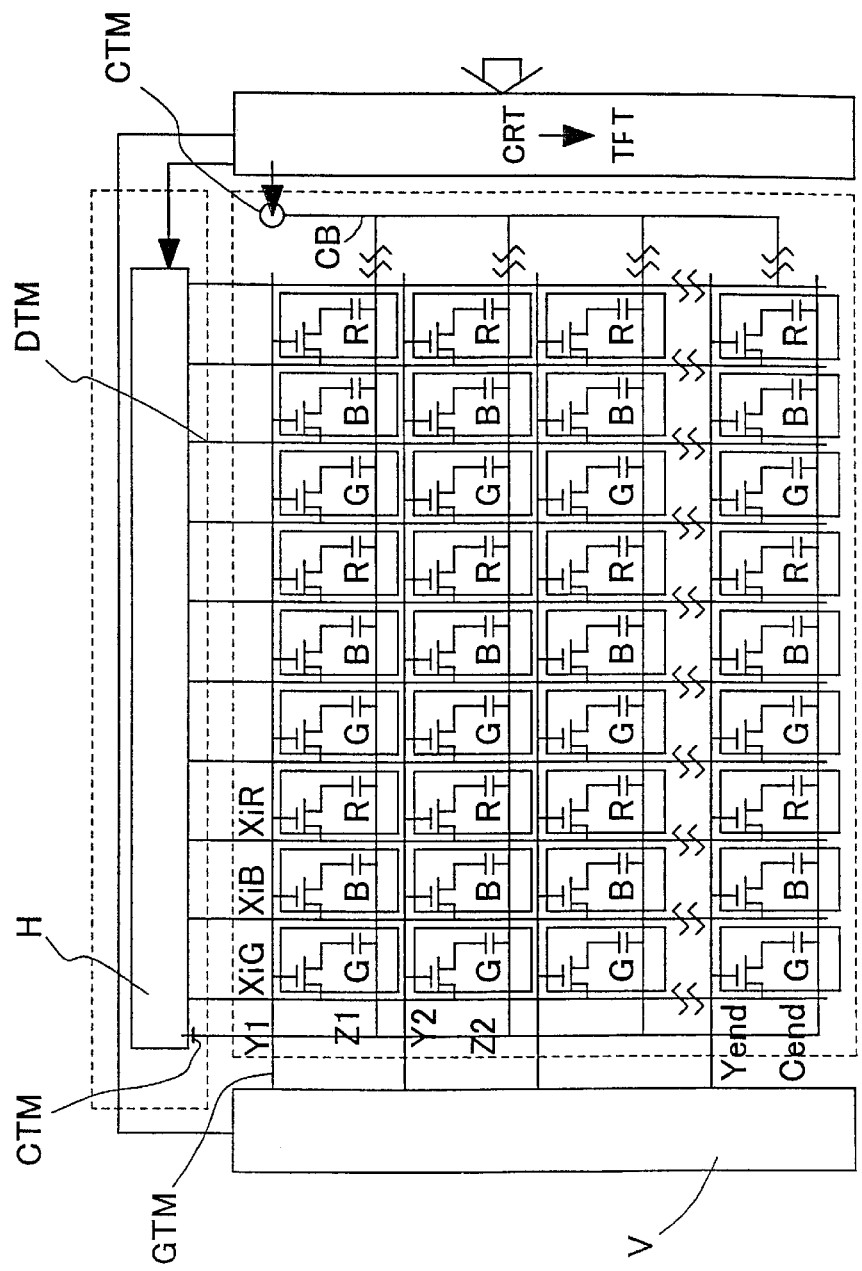
FIG. 7 is a view showing the equivalent circuit of the liquid crystal panel according to the present invention.

FIG. 7 is a view showing the equivalent circuit of the liquid crystal panel as well as the external circuits of the liquid crystal panel.

Scanning signals (voltage signals) are sequentially supplied to the individual gate signal lines GL disposed to be extended in the x-direction of FIG. 7 and to be juxtaposed in the y-direction of FIG. 7, by a vertical scanning circuit V.

The thin film transistors TFT in the respective pixel areas arranged along the one of the gate signal lines GL to which a scanning signal is supplied are turned on by the scanning signal.

At this timing, video signals are supplied to the individual drain signal lines DL from a video signal driver circuit H, and these video signals are applied to the respective pixel electrodes PX via the thin film transistors of the corresponding pixel areas.

In the respective pixel areas, counter voltages are applied to the counter electrodes CT formed together with the pixel electrodes PX via the counter voltage signal lines CL, so that electric fields can be generated between the pixel electrodes and the counter electrodes CT.

The optical transmissivity of the liquid crystal LC is controlled by the ones (in-plane electric fields) of these electric fields each of which has a component parallel to the transparent substrate SUB1.

Incidentally, in FIG. 7, the symbols R, G and B shown in the individual pixel areas represent that a red filter, a green filter and a blue filter are formed in the respective pixel areas.

<<Other Embodiments>>

In the above-described embodiment, the counter electrodes CT are formed below the pixel electrodes PX with the insulating film GI interposed therebetween. However, the present invention is not limited to this construction, and it goes without saying that the pixel electrodes PX are formed below the counter electrodes CT with the insulating film GI interposed therebetween.

In the above-described embodiment, the pixel electrodes PX formed in juxtaposition are formed as rectilinear stripshaped electrodes in the respective pixel areas.

However, the present invention is not limited to this construction, and it goes without saying that each of the pixel electrodes PX may be an element having one or more bent portions in the direction of extension of the pixel electrode PX.

Such an electrode is called a multi domain scheme in which the direction of an electric field generated between the electrode and the counter electrode CT is made different to provide the advantage of canceling a difference in the optical transmissivity of a liquid crystal when a display area is viewed in any direction different from the direction normal to its front surface.

Even in this case, the holes CTH can be formed in the counter electrode CT at locations corresponding to the bent extended portion of the pixel electrode PX.

Figure 9:
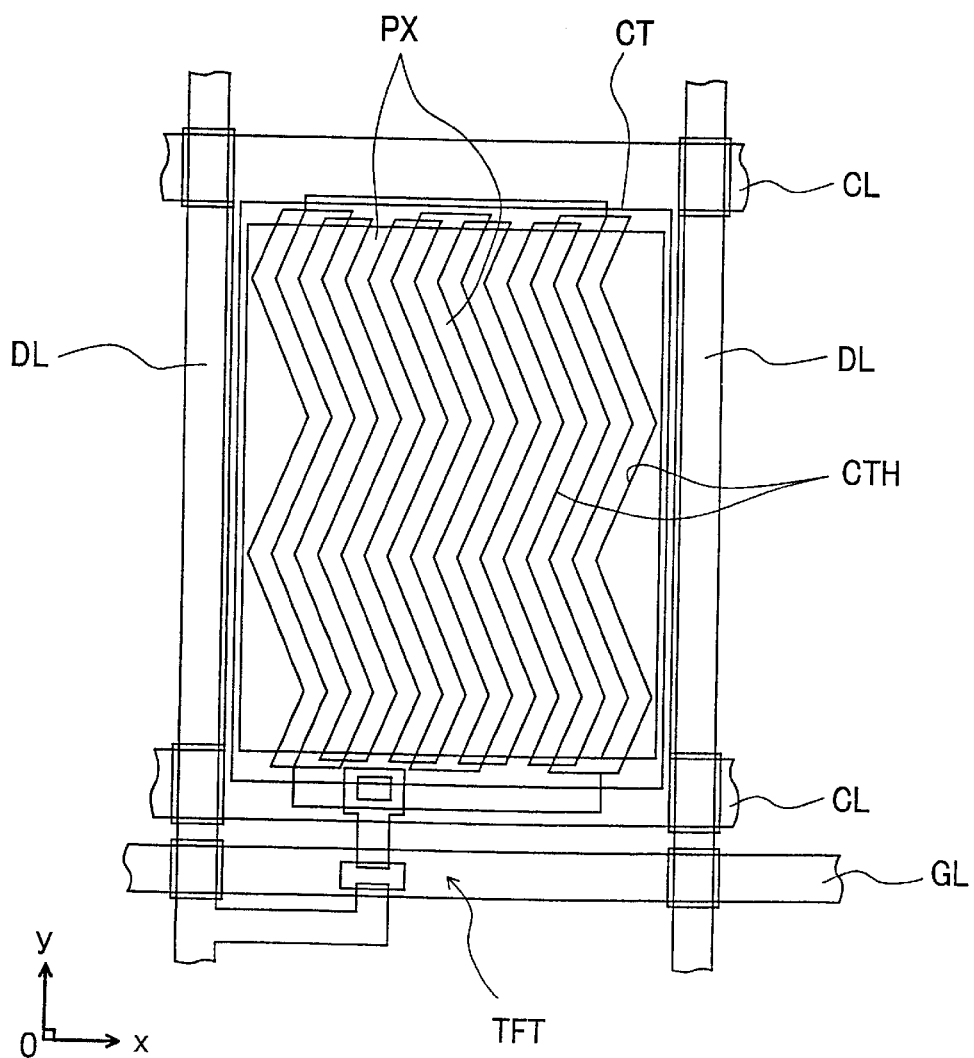
FIG. 9 is a plan view showing another embodiment of the liquid crystal display device according to the present invention.

FIG. 9 is a plan view which corresponds to FIG. 1, showing an example to which the multi domain scheme is applied.

Each of the pixel electrodes PX has, for example, a zigzag pattern along its extension direction, and the holes CTH each having a zigzag shape along the zigzag pattern are respectively formed in the counter electrodes CT which are superposed on some of the pixel electrodes PX (for example, every other one of the pixel electrodes PX).

The extension direction of the pixel electrodes PX is along the y-direction of FIG. 9, but the present invention is not limited to this construction and can, of course, be applied to a construction in which the extension direction of the pixel electrodes PX is along the x-direction of FIG. 9.

In the above-described embodiment, an electrode which is formed over nearly the whole of the central portion of the pixel area except the periphery thereof serves as the counter electrode CT, while plural strip-shaped electrodes which are juxtaposed in one direction serve as the pixel electrodes PX. However, an electrode which is formed over the central portion of the pixel area except the periphery thereof may be used as the pixel electrode PX, while plural strip-shaped electrodes which are juxtaposed in one direction may be used as the counter electrode CT.

As is apparent from the foregoing description, in accordance with the liquid crystal display device according to the present invention, it is possible to prevent the occurrence of horizontal smear and image retention.

What is claimed is:

1. A liquid crystal display device comprising:
   first and second substrates with a liquid crystal layer provided therebetween;
   a plurality of gate lines and a plurality of drain lines provided on the first substrate;
   a plurality of pixel regions defined by the gate lines and drain lines;
   a plurality of first electrodes being provided within at least one of the pixel regions, the first electrodes being substantially parallel to each other, wherein the adjacent first electrodes are spaced apart and define a space therebetween, the first electrodes being wider than the space;
   a plurality of second electrodes being provided within the at least one pixel region, wherein at least one of the second electrodes is vertically aligned to the space defined by the adjacent first electrodes; and
   an insulating layer provided between the first and second electrodes.

2. The liquid crystal display device according to claim 1, wherein the first electrodes are substantially to the second electrodes.

3. The liquid crystal display device according to claim 2, further comprising:
   a first connecting member coupled to the plurality of first electrodes;
   a second connecting member coupled to the plurality of second electrodes; and
   an insulating layer provided between the first connecting member and the second connecting member.

4. The liquid crystal display device according to claim 3, wherein the plurality of first electrodes and the plurality of second electrodes have a zigzag pattern.

5. The liquid crystal display device according to claim 2, wherein each pixel region includes the plurality of first electrodes and the plurality of second electrodes provided therein and one or more of the second electrodes are vertically aligned to the first electrodes, wherein a number of the second electrodes being vertically aligned to the first electrodes is greater than a number of the second electrodes being vertically aligned to the spaces.

6. The liquid crystal display device according to claim 2, wherein the first electrodes are counter electrodes and the second electrodes are pixel electrodes.

7. The liquid crystal display device according to claim 6, wherein at least one of the first electrodes includes overlapping portion with a counter voltage signal line.

8. The liquid crystal display device according to claim 2, wherein the second-electrodes are transparent conductive material.

9. The liquid crystal display device according to claim 8, wherein the first electrodes are transparent conductive material.

10. The liquid crystal display device according to claim 1, further comprising:

a first connecting member coupled to the plurality of first electrodes;

a second connecting member coupled to the plurality of second electrodes; and an insulating layer provided between the first connecting member and the second connecting member.

11. The liquid crystal display device according to claim 10, wherein the plurality of first electrodes and the plurality of second electrodes have a zigzag pattern.

12. The liquid crystal display device according to claim 10, wherein each pixel region includes the plurality of first electrodes and the plurality of second electrodes provided therein and one or more of the second electrodes are vertically aligned to the first electrodes, wherein a number of the second electrodes being vertically aligned to the first electrodes is greater than a number of the second electrodes being vertically aligned to the spaces.

13. The liquid crystal display device according to claim 10, wherein the first electrodes are counter electrodes the second electrodes are pixel electrodes.

14. The liquid crystal display device according to claim 10, wherein the second electrodes are transparent d conductive material.

15. The liquid crystal display device according to claim 14, where the first electrodes are transparent and conductive material.

16. The liquid crystal display device according to claim 15, wherein at least one of the first electrodes includes overlapping portion with a counter voltage signal line.

17. A liquid crystal display device comprising:

first and second substrates with a liquid crystal layer provided therebetween;

a plurality of gate lines and a plurality of drain lines formed on the first substrate;

a pixel region defined by adjacent gate lines and drain lines; and a plurality of first electrodes and a plurality of second electrode provided within the pixel region on the first substrate, the first electrodes and second electrodes being transparent and conductive material, wherein at least two opposing edges of one of the first electrodes are covered by opaque material.

18. The liquid crystal display device according to claim 17, wherein the first electrodes are counter electrodes, he second electrodes are pixel electrodes, and the opaque material is a counter voltage signal line.

19. The liquid crystal display device according to claim 17, wherein the one of the first electrodes and the opaque material is electrically coupled.

20. The liquid crystal display device according to claim 17, wherein the opaque material is formed on the one of the first electrodes.

21. The liquid crystal display device according to claim 17, wherein the plurality of first electrodes and the plurality of second electrodes are provided in a zigzag pattern.

22. The liquid crystal display device according to claim 17, wherein the plurality of first electrodes are arranged substantially parallel and spaced apart from each other to define a space between two adjacent first electrodes, a first set of the second electrodes directly overlying the space and a second set of the second electrodes directly overlying one or more of the first electrodes, the first electrode being wider than the space, wherein an insulating layer is provided between the first and second electrodes.

23. The liquid crystal display device according to claim 22, wherein a number of the second electrodes in the second set is greater than a number of the second electrodes in the first set.

24. The liquid crystal display device according to claim 17, wherein an edge of at least one of the second electrodes includes an portion that overlaps with the opaque material, where an insulating layer is provided therebetween.

* * * * *